Jan. 21, 1958      J. ACKERET ET AL      2,820,599

DUAL UNIT JET PROPULSION PLANT FOR AIRCRAFT

Filed Feb. 3, 1955      2 Sheets-Sheet 1

INVENTORS
Jakob Ackeret
and Curt Keller

BY

ATTORNEYS

Jan. 21, 1958   J. ACKERET ET AL   2,820,599
DUAL UNIT JET PROPULSION PLANT FOR AIRCRAFT
Filed Feb. 3, 1955   2 Sheets-Sheet 2

INVENTORS:
Jakob Ackeret
and Curt Keller
By
Attorneys

United States Patent Office 2,820,599
Patented Jan. 21, 1958

2,820,599

DUAL UNIT JET PROPULSION PLANT FOR AIRCRAFT

Jakob Ackeret and Curt Keller, Kusnacht, Switzerland, assignors to Aktiengesellschaft fuer Technische Studien, Zurich, Switzerland, a corporation of Switzerland Application February 3, 1955, Serial No. 485,965

7 Claims. (Cl. 244—15)

The invention relates to jet propulsion of an aircraft.

In aircraft propulsion units, it is frequently desired to deal with large quantities of air by the propulsion means. By the acceleration of large quantities of air, high propulsion efficiency is obtained and an effective boundary layer control by means of suction is rendered possible, or other aerodynamic effects, for example in hollow throughflow wings, are obtained.

Propellers are unsuitable for the delivery of large quantities of air if high speeds are aimed at, but it is possible to employ a jet propulsion unit designed in the manner of the so-called ducted fans which can receive their drive in various ways.

The object of the invention is to provide a simple propulsion unit which is efficient at any altitude of an aircraft, and which can be accommodated, if necessary, in a small space within the wings and can be employed to advantage for suction boundary layer control.

For this purpose, in accordance with the invention, in a jet propulsion unit the engine serving to produce the jet is driven at least partly by a thermal power engine in which a gaseous working medium circulates in a closed cycle, the said medium being brought to higher pressure in a compressor, heated in a heating system by a supply of heat from the outside, expanded in a turbine, and cooled in a cooler before being re-compressed.

In such installations, it is possible to circulate the working medium at an increased pressure level. In this way, high outputs can be obtained in relatively small engines.

The jet propulsion unit according to the invention is employed as an additional set in combination with a turbo-jet power unit of known type and the heating system is arranged in the flow path of the hot compressed gas which is supplied to the turbine of the said turbo-jet power unit.

A constructional form of the subject of the invention is illustrated in simplified form by way of example in the accompanying drawings, in which.

Figure 1:
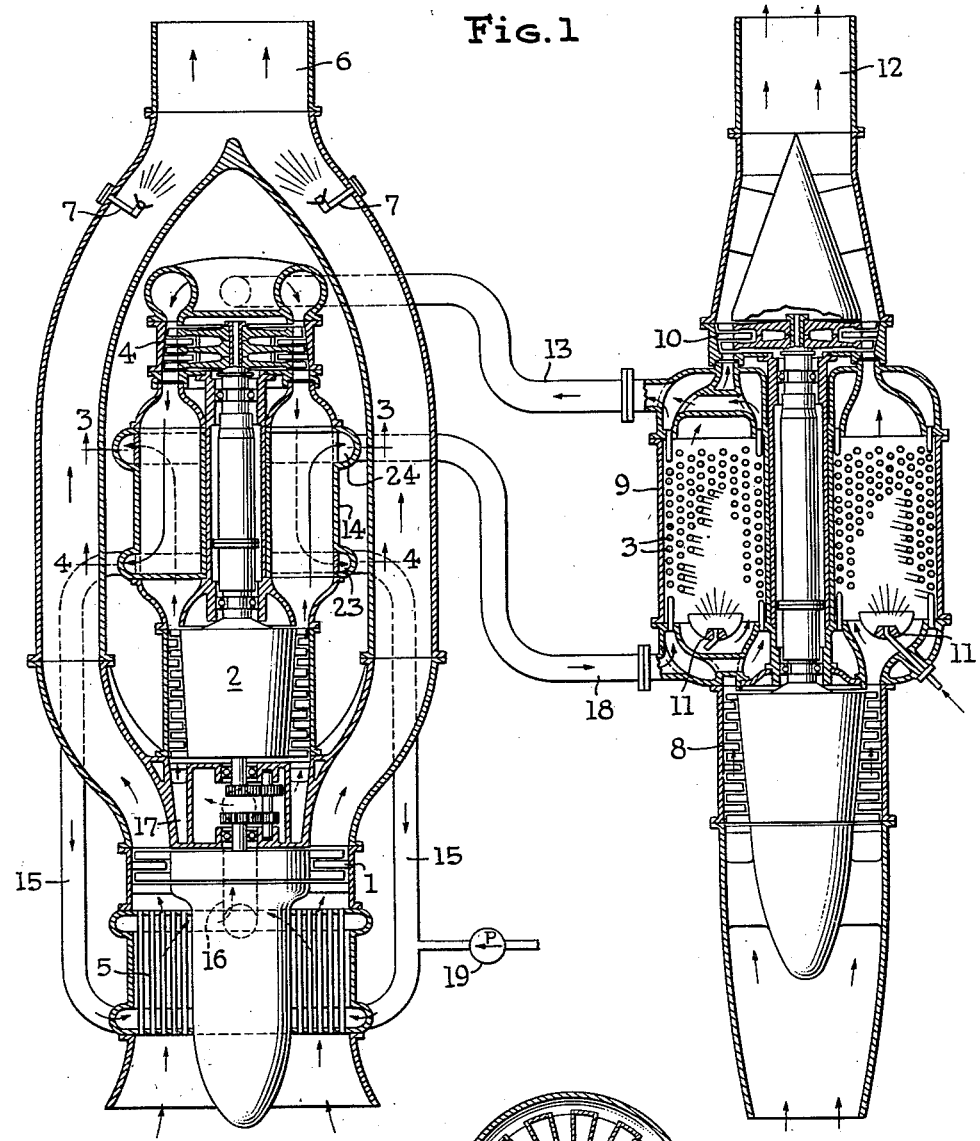
Fig. 1 shows an axial longitudinal section of the jet propulsion units.
Figure 3:
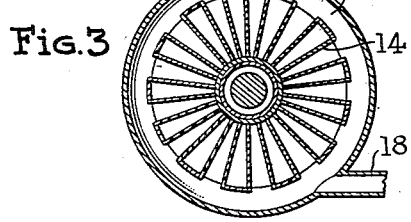
Fig. 3 is a section on the line 3—3 of Fig. 1.
Figure 4:
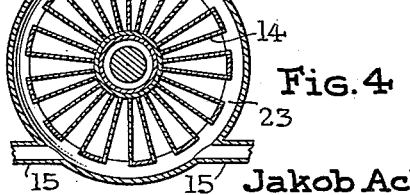
Fig. 4 is a section on the line 4—4 of Fig. 1.

In the jet propulsion unit a compressor 1 serving to produce the jet is driven by a thermal power engine in which a gaseous working medium circulates in a closed cycle, comprising a compressor 2, a tubular heating system 3, a turbine 4 and a cooler 5. The jet issues rearwardly through a nozzle 6.

In the flow path of the air in advance of the nozzle 6 are disposed burners 7 by means of which fuel may be burnt in the jet propulsion unit in a manner known per se in order to increase the thrust.

The turbo-jet power unit consists essentially of a compressor 8, a combustion chamber 9 and a turbine 10. The compressor 8 supplies compressed air to the combustion chamber 9 which comprises nozzles 11 for injecting a suitable fuel for combustion purposes. The hot gas is supplied to the turbine 10 which drives the compressor 8, and the exhaust of the turbine 10 is directed by a nozzle 12 as a propelling jet.

Compressed gaseous working medium is heated in the tubular heating system 3 by heat generated by the combustion in the combustion chamber 9 and supplied through a duct 13 to the turbine 4, wherein it expands while doing work. The turbine 4 drives the compressor 2 of the closed cycle thermal power engine and the compressor 1 serving to produce the jet issuing through the nozzle 6.

The expanded working medium leaving the turbine 4 traverses first a plate type heat exchanger 14, hereinafter described, and is then led through ducts 15 to the cooler 5 which is arranged in advance of the intake of the compressor 1 in the flow path of the air forming the jet issuing from the nozzle 6. The closed cycle gaseous working medium is thereby cooled by the inake air of the compressor 1.

The so-cooled working medium is then fed through channels 16, 17 to the intake of the compressor 2 in which it is re-compressed, and after being preheated in the heat exchanger 14 by the expanded working medium, is again delivered, through a duct 18, to the tubular heating system 3, whereby the cycle of the working medium closes.

The heat exchanger 14 is of known form and comprises radial heat transfer plates which separate two series of alternating passages which respectively communicate with annular manifolds 23 and 24. The first series of passages all communicate at their inlet ends with the discharge from compressor 2 and at their discharge ends with manifold 24 and hence with conduit 18. The alternate passages comprising the second series all communicate at their inlet ends with the exhaust of turbine 4 and at their discharge ends with manifold 23 and hence with connections 15.

As a consequence, exhaust from turbine 4 exchanges heat with compressed air discharged by compressor 2, so that air compressed by compressor 2 recovers heat from the exhaust of turbine 4 before receiving heat from the external source (burners 11) through the walls of tubular system 3.

A pump 19 serves to charge the closed cycle system with compressed gaseous working medium.

Figure 2:
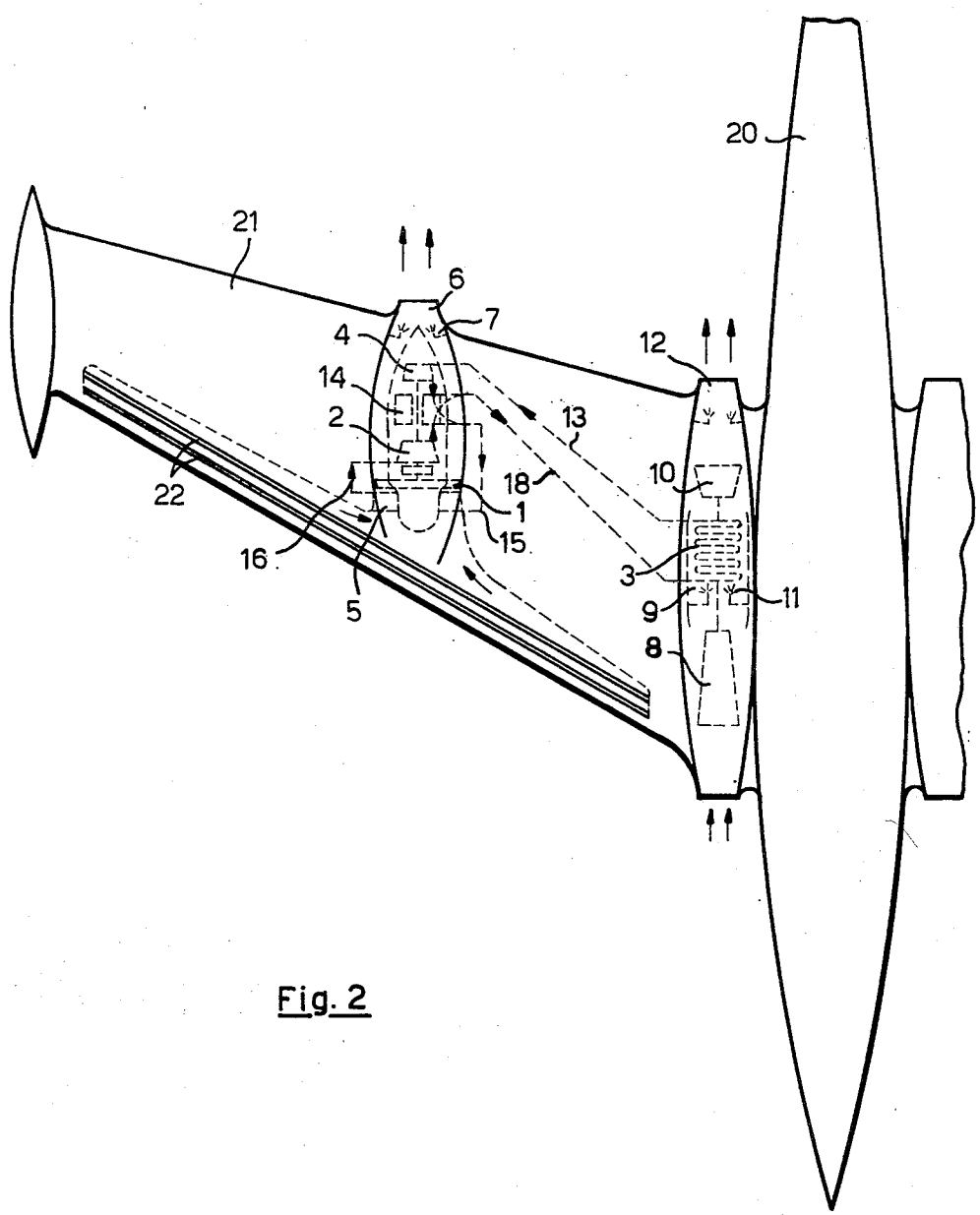
Fig. 2 shows in a smaller scale a plan view of one half of an aircraft, with the arrangement of the propelling engines indicated therein.

In the arrangement shown in Fig. 2 the aircraft comprises a fuselage 20 and wing 21. The jet proplusion unit is disposed in the wing 21 and the air required to produce the jet is taken in through apertures 22 formed in the wing of the aircraft, which serve to control the boundary layer by suction.

An arrangement of the type described, in which such a jet propulsion unit is employed to suck away the boundary layer, is particularly advantageous because the development of large aircraft for long-range flight to some extent necessarily leads to the use of boundary layer control by suction. In order to avoid passages of excessive length, and with a view to weight distribution, the use of a plurality of such suction sets is convenient in such cases.

It is advantageous to effect the heating in a somewhat modified combustion chamber of a turbo-jet power unit of known type as in the illustrated embodiment, because, as is known, such power units must be operated with a large excess of air, especially in cases where the compression ratio is high, so that the oxygen aspirated by the compressor is almost completely discharged again. It is therefore expedient to burn in the combustion chamber a much larger quanttiy of fuel than is normal, and to employ the liberated quantity of heat for the external heating of the working medium of the closed gas cycle. It is then possible to multiply the performance without varying the operating state of the turbo-jet power unit. The increased pressure drop is partially offset by the greater expulsion of mass as a result of the increased fuel supply.

The use of boundary-layer air for the drive as illustrated is also very favorable.

The regulation is extremely elastic since it is only necessary to vary the rate of supply of fuel, and at the same time to utilise the possibility of varying the pressure level in the closed gas cycle. This cycle can then give any desired performance below the maximum while the efficiency remains substantially unchanged. Since, in addition, the density of the working medium in the closed cycle is independent of the density of the external air, a high performance can also be obtained at great altitudes. Closed-cycle engines are extremely small with high pressures and can be well accommodated in very thin wings. Moreover, the elimination of combustion in such assemblies housed in the wings results in greater safety.

Instead of using air for the closed gas cycle, a gas may advantageously be employed, the molecular weight of which is lower than the molecular weight of the air, in particular helium. It is then possible, by reason of the better heat transfer, to employ very small heating surfaces.

Moreover, various other arrangements of the cooler of the closed cycle thermal power engine are possible. For example, the said cooler may be exposed to the relative wind on the outer shell of the aircraft, or it may be disposed in the air intake shaft in front of the turbo-jet power unit, that is to say, in front of the compressor 8.

In the arrangement shown in Fig. 1, the heat exchanger 14 is disposed between the turbine 4 and the compressor 2 of the closed cycle thermal power engine and in axial alignment therewith. Such an arrangement is favorable for the guiding of the gas between the engines and apparatus.

Alternatively, the closed-cycle thermal power engine may be so designed that the working medium expands in the turbine almost to the end compression temperature, and that no heat exchanger is provided or necessary for the heat exchange between the compressed working medium and the expanded working medium.

What is claimed is:

1. In an aircraft the combination of a turbo-jet power unit comprising compressing means; a combustion chamber to which compressed air is supplied by said compressing means; turbine means in driving relation with said compressing means; means for causing combustion in said combustion chamber; means for supplying hot compressed gas from said combustion chamber to said turbine means; and duct means in communication with the outlet of said turbine means, directing the exhaust of said turbine means as a propulsion jet; and a further jet propulsion unit comprising a turbine and a compressor whereby a gaseous working medium which circulates in a closed cycle is expanded in said turbine while doing work and re-compressed in said compressor; a jet-producing compressor in which ambient air is compressed, said jet-producing compressor and said compressor of the closed cycle being connected to be driven by said turbine of the closed cycle; duct means, in communication with the outlet of said jet-producing compressor, and directing the compressed air as a propulsion jet; a flow connection, including a cooler, leading the expanded working medium from the outlet of said turbine to the intake of said compressor of the closed cycle; a heating system arranged in the flow path of said hot compressed gas which is supplied to the turbine means of said turbo-jet power unit, in which heating system the re-compressed working medium is heated by heat given up by said hot compressed gas; and supply and discharge connections leading the re-compressed working medium from the outlet of the compressor of the closed cycle to said heating system and leading the heated re-compressed working medium from said heating system to said turbine of the closed cycle.

2. The combination defined in claim 1 in which the flow connection between the outlet of the turbine and the intake of the compressor of the closed cycle comprises a heat exchanger in which the expanded working medium gives up heat to the re-compressed working medium.

3. The combination defined in claim 2 in which said heat exchanger is disposed between the turbine and the compressor of the closed cycle and in axial alignment therewith.

4. The combination defined in claim 1 in which the cooler of the closed cycle working medium is arranged in the flow path of the air forming the jet of the said further jet propulsion unit.

5. The combination defined in claim 4 in which the said cooler is arranged in advance of the intake of the compressor serving to produce the jet so that the working medium is cooled by the intake air of the last named compressor.

6. The combination defined in claim 1 in which the aircraft is of a winged type and said further jet propulsion unit is disposed within a wing of the aircraft and duct means are provided for leading air from the boundary layer of said wing to the intake of the jet-producing compressor.

7. In an aircraft the combination of a turbo-jet power unit comprising compressing means; a combustion chamber to which compressed air is supplied by said compressing means; turbine means in driving relation with said compressing means; means for causing combustion in said combustion chamber; means for supplying hot compressed gas from said combustion chamber to said turbine means; and duct means in communication with the outlet of said turbine means, directing the exhaust of said turbine means as a propulsion jet; and a further jet propulsion unit comprising a turbine and a compressor whereby a gaseous working medium which circulates in a closed cycle is expanded in said turbine while doing work and re-compressed in said compressor; a jet-producing compressor in which ambient air is compressed, said jet-producing compressor and said compressor of the closed cycle being connected to be driven by said turbine of the closed cycle; duct means, in communication with the outlet of said jet producing compressor, and directing the compressed air as a propulsion jet; a flow connection, including a cooler, leading the expanded working medium from the outlet of said turbine to the intake of said compressor of the closed cycle; a tubular heating system arranged in said combustion chamber of said turbo-jet power unit, in which the re-compressed working medium is heated by heat generated by the combustion in said combustion chamber; and supply and discharge connections leading the re-compressed working medium from the outlet of the compressor of the closed cycle to said heating system and leading the heated re-compressed working medium from said heating system to said turbine of the closed cycle.

References Cited in the file of this patent

UNITED STATES PATENTS

| | | |
|---|---|---|
| 2,399,152 | Traupel | Apr. 23, 1946 |
| 2,604,277 | Anxionnaz et al. | July 22, 1952 |
| 2,677,932 | Forsling | May 11, 1954 |